(12) United States Patent
Salemme et al.

(10) Patent No.: US 7,452,563 B2
(45) Date of Patent: Nov. 18, 2008

(54) COMPOSITIONS AND METHODS FOR PRODUCING FLAVORED SEASONINGS THAT CONTAIN REDUCED QUANTITIES OF COMMON SALT

(75) Inventors: Francis Raymond Salemme, Yardley, PA (US); Abraham I. Bakal, Margate, NJ (US); Richard Barndt, Highland Park, NJ (US)

(73) Assignee: Redpoint Bio Corporation, Ewing, NJ (US)

( * ) Notice: Subject to any disclaimer, the term of this patent is extended or adjusted under 35 U.S.C. 154(b) by 512 days.

(21) Appl. No.: 11/155,738

(22) Filed: Jun. 20, 2005

(65) Prior Publication Data

US 2006/0286275 A1 Dec. 21, 2006

(51) Int. Cl.
A23L 1/22 (2006.01)
A23L 1/237 (2006.01)

(52) U.S. Cl. .................. 426/649; 426/74; 426/534; 426/535; 426/582; 426/650

(58) Field of Classification Search .............. 426/649, 426/74, 534, 535, 582, 650
See application file for complete search history.

(56) References Cited

U.S. PATENT DOCUMENTS

| | | |
|---|---|---|
| 3,505,082 A | 4/1970 | Miller |
| 3,647,482 A | 3/1972 | Yueh |
| 3,860,732 A | 1/1975 | Eisenstadt |
| 3,872,227 A | 3/1975 | Hoff et al. |
| 4,243,691 A | 1/1981 | Mohlenkamp, Jr et al. |
| 4,297,375 A | 10/1981 | Shackelford |
| 4,376,132 A | 3/1983 | Eguchi et al. |
| T104,004 I4 | 3/1984 | von Rymon Lipinski |
| 4,514,431 A | 4/1985 | Buckholz, Jr. et al. |
| 4,560,574 A | 12/1985 | Meyer |
| 4,563,359 A | 1/1986 | Shimizu et al. |
| 4,567,047 A | 1/1986 | SCM Corporation |
| 4,600,708 A | 7/1986 | Reuter et al. |
| 4,826,824 A | 5/1989 | Schiffman |
| 4,963,387 A | 10/1990 | Nakagawa et al. |
| 5,145,707 A | 9/1992 | Lee |
| 5,173,323 A | 12/1992 | Omari |
| 5,232,735 A | 8/1993 | Kurtz et al. |
| 5,372,834 A | 12/1994 | Buckholz, Jr. et al. |
| 5,589,357 A | 12/1996 | Martinez et al. |
| 5,631,038 A | 5/1997 | Kurtz et al. |
| 5,631,231 A | 5/1997 | Kurtz et al. |
| 5,631,232 A | 5/1997 | Kurtz et al. |
| 5,631,240 A | 5/1997 | Kurtz et al. |
| 5,631,252 A | 5/1997 | Kurtz et al. |
| 5,631,272 A | 5/1997 | Kurtz et al. |
| 5,631,292 A | 5/1997 | Kurtz et al. |
| 5,631,294 A | 5/1997 | Kurtz et al. |
| 5,631,295 A | 5/1997 | Kurtz et al. |
| 5,631,299 A | 5/1997 | Kurtz et al. |
| 5,637,618 A | 6/1997 | Kurtz et al. |
| 5,639,788 A | 6/1997 | Kurtz et al. |
| 5,641,795 A | 6/1997 | Kurtz et al. |
| 5,641,799 A | 6/1997 | Kurtz et al. |
| 5,641,811 A | 6/1997 | Kurtz et al. |
| 5,641,812 A | 6/1997 | Kurtz et al. |
| 5,643,894 A | 7/1997 | Kurtz et al. |
| 5,643,941 A | 7/1997 | Kurtz et al. |
| 5,643,945 A | 7/1997 | Kurtz et al. |
| 5,643,955 A | 7/1997 | Kurtz et al. |
| 5,643,956 A | 7/1997 | Kurtz et al. |
| 5,646,122 A | 7/1997 | Kurtz et al. |
| 5,650,403 A | 7/1997 | Kurtz et al. |
| 5,654,311 A | 8/1997 | Kurtz et al. |
| 5,665,755 A | 9/1997 | Kurtz et al. |
| 5,693,756 A | 12/1997 | Li et al. |
| 5,700,792 A | 12/1997 | Kurtz et al. |
| 5,703,053 A | 12/1997 | Kurtz et al. |
| 5,789,250 A | 8/1998 | Ikezaki |
| 5,817,759 A | 10/1998 | Margolskee |
| 5,853,792 A | 12/1998 | Zolotov et al. |

(Continued)

FOREIGN PATENT DOCUMENTS

CH 497 136 A 11/1970

(Continued)

OTHER PUBLICATIONS

Anderson, J., et al., "Potassium and Health," Colorado State University Cooperative Extension, last updated on Apr. 8, 2005, accessed online at http://www.ext.colostate.edu/pubs/foodnut/09355.html on May 15, 2005, pp. 1-4.
"Cheese Flavors," The Edlong Corporation, accessed online at http://www.edlong.com/flavors/cheese.asp on Jun. 17, 2005, 1 page.
Chiou, T.-K. and Lai, M.-M., "Comparison of taste components in cooked meats of small abalone fed different diets," *Fisheries Science* 68:388-394, Blackwell Publishing (2002).
Chiou, T.-K., "Utilization of Cooking Waste of Canned Tuna As Flavorings," *Food Science* 208-217, The Chinese Institute of Food Science and Technology (1994).
Chiou, T.-K., et al., Seasonal variations of chemical constituents in the muscle and viscera of small abalone fed different diets, *Fisheries Science* 67:146-156, Blackwell Publishing (2001).

(Continued)

*Primary Examiner*—Helen F Pratt
(74) *Attorney, Agent, or Firm*—Sterne, Kessler, Goldstein & Fox P.L.L.C.

(57) ABSTRACT

The present invention provides flavored seasoning compositions containing low-salt substitutes that reduce the quantity of common salt used to flavor foods. More specifically, the compositions contain (a) a flavored seasoning mixture comprising flavoring agents, and flow agents, bulking agents, binding agents and/or preservatives, and (b) a salt substitute containing potassium chloride and bitterness inhibitors taurine and 5'-adenosinic acid, 5'-inosinic acid and/or 5'-guanylic acid. Furthermore, the present invention provides foods containing these compositions, methods of using these compositions and methods for preparing them.

64 Claims, No Drawings

U.S. PATENT DOCUMENTS

| | | | |
|---|---|---|---|
| 5,866,608 | A | 2/1999 | Kurtz et al. |
| 5,897,908 | A | 4/1999 | Berglund et al. |
| 6,008,250 | A | 12/1999 | Kurtz et al. |
| 6,015,792 | A | 1/2000 | Kurtz et al. |
| 6,368,651 | B1 | 4/2002 | Gerlat et al. |
| 6,540,978 | B1 | 4/2003 | Margolskee et al. |
| 6,541,050 | B1 | 4/2003 | Bonorden et al. |
| 6,777,021 | B2 | 8/2004 | Huber et al. |
| 6,783,788 | B2 | 8/2004 | Kuroda et al. |
| 6,942,874 | B2 | 9/2005 | McGregor et al. |
| 2003/0035875 | A1 | 2/2003 | Dulebohn et al. |
| 2003/0194423 | A1 | 10/2003 | Torney et al. |

FOREIGN PATENT DOCUMENTS

| | | |
|---|---|---|
| DE | 33 31 517 A1 | 3/1984 |
| EP | 0 059 363 B1 | 12/1984 |
| EP | 0 122 400 B1 | 7/1987 |
| EP | 0 125 021 B1 | 7/1987 |
| EP | 0 291 980 B1 | 1/1992 |
| EP | 0 416 667 B1 | 9/1993 |
| JP | 48-10227 | 4/1973 |
| JP | 48-17044 | 5/1973 |
| JP | 59-55165 A | 3/1984 |
| JP | 59-210866 A | 11/1984 |
| JP | 61-271969 A | 12/1986 |
| JP | 4-40881 A | 2/1992 |
| JP | 11-169131 A | 6/1999 |
| RU | 2003265 C1 | 11/1993 |
| WO | WO 97/04666 A1 | 2/1997 |
| WO | WO 00/38536 A2 | 7/2000 |
| WO | WO 02/096464 A1 | 12/2002 |
| WO | WO 03/075661 A1 | 9/2003 |

OTHER PUBLICATIONS

Communication from Quaker Foods & Beverages to the Food and Drug Administration Regarding Food Labeling; Nutrient Content Claims, Definition of Sodium Levels for the Term "Healthy" Docket Nos. 91N-384H and 96P-0500, pp. 1-4, mailed Jul. 10, 2003.

Danilova, V., et al., "Responses of Single Taste Fibers and Whole Chorda Tympani and Glossopharyngeal Nerve in the Domestic Pig. *Sus scofa*," *Chem. Senses* 24:301-316, Oxford University Press (1999).

Unverified English language translation for CH 497 136 A, document FP1, Nov. 30, 1970.

STN*Easy*/CAplus database, Accession No. 1974:36023, English language abstract for JP 48-10227, document FP 2.

STN/Easy CAplus database, Accession No. 1973:457692, English language abstract for JP 48-17044, document FP3.

Dialog File No. 351, Accession No. 3918294, Derwent WPI English language abstract for DE 3331517 A, FP5, Aug. 3, 1984.

Dialog File No. 347, Accession No. 1343565, Derwent WPI English language abstract for JP 59-55165 A, document FP6, Mar. 30, 1984.

Dialog File No. 347, Accession No. 1499266, Derwent WPI English language abstract for JP 59-210866 A, document FP7, Nov. 29, 1984.

Dialog File No. 351, Accession No. 3529012, Derwent WPI English language abstract for EP 0 059 363 B1, document FP8, Feb. 16, 1982.

STN*Easy*/CAplus database, Accession No. 1987:212816, English language abstract for JP 61-271969 A, document FP9, Feb. 12, 1986.

Dialog File No. 351, Accession No. 8972382, Derwent WPI English language abstract for JP 4-40881 A, document FP13, Feb. 12, 1992.

Dialog File No. 351, Accession No. 9810059, Derwent WPI English language abstract for RU 2003265 C, document FP15, Aug. 12, 1992.

Japanese Patent Office, Patent Abstracts of Japan, English language abstract for 11-169131, document FP17, Jun. 21, 1999.

Engel, E., et al., "Determination of taste-active compounds of a bitter Camembert cheese by omission tests," *J. Dairy Res.* 68:675-688, Cambridge University Press (2001).

"Flavor Potentiators," in *Flavor Chemistry and Technology*, Heath, H.B. and Reineccius, G., eds., AVI Publishing Company, Inc. Westport Connecticut, pp. 318-331 (1986).

"Food additive: Information From Answers.com," accessed online at http://www.answers.com/topic/food-additive on Jun. 6, 2005, 5 pages.

Fuke, S., "Taste-active components of seafoods with special reference to umami substances," in *Seafoods: Chemistry, Processing Technology and Quality*, 1st Ed., Shahidi, F. and Botta, J.R., eds., Chapman & Hall, pp. 115-139 (1994).

RD 20729, Jul. 10, 1981, Anonymous.

Unverified English language translation for CH 497 136 A, document FP1.

Dialog File No. 351, Accession No. 3918294, Derwent WPI English language abstract for DE 3331517 A, FP5.

Dialog File No. 347, Accession No. 1343565, Derwent WPI English language abstract for JP 59-55165 A, document FP6.

Dialog File No. 347, Accession No. 1499266, Derwent WPI English language abstract for JP 59-210866 A, document FP7.

Dialog File No. 351, Accession No. 3529012, Derwent WPI English language abstract for EP 0 059 363 B1, document FP8.

STN*Easy*/CAplus database, Accession No. 1987:212816, English language abstract for JP 61-271969 A, document FP9.

Dialog File No. 351, Accession No. 8972382, Derwent WPI English language abstract for JP 4-40881 A, document FP13.

Dialog File No. 351, Accession No. 9810059, Derwent WPI English language abstract for RU 2003265 C, document FP15.

Japanese Patent Office, Patent Abstracts of Japan, English language abstract for 11-169131, document FP17.

Gravina, S.A., et al., "Biomimetic In Vitro Assay for the Characterization of Bitter Tastants and Identification of Bitter Taste Blockers," in *Challenges in Taste Chemistry and Biology*, Hofmann, T., et al., eds., Presented at the 224th ACS National Meeting & Exposition (2002), Chapter 6, pp. 91-10, American Chemical Society (Published 2004).

Harder, D.B., et al., "Assessing gustatory detection capabilities using preference procedures," *Chemical Senses* 14:547-564, IRL Press (1989).

Hayashi, T., et al., "Sensory Study of Flavour Compounds in Extracts of Salted Salmon Eggs (Ikura)," *J. Sci. Food Agric.* 50:343-356, Elsevier Applied Science (1990).

Hwang, D.-F., et al., "Seasonal variations of free amino acids and nucleotide-realted compounds in the muscle of cultured Taiwanese puffer *Takifugu rubripes*," *Fisheries Science* 66:1123-1129, Blackwell Publishing (2000).

"Inactive Ingredients (Excipients)," Whole Foods Market: Health Info, accessed online at http://www.wholefoodsmarket.com/healthinfo/excipients.html on Jun. 6, 2005, 5 pages.

"Industry Overview U.S. Cheese: Tradition, Quality, Variety, Abundance," U.S. Dairy Export Council, accessed online at http://www.usdec.org/Products/CheeseSpecs/content.cfm?Itemnumber=420 on Jun. 17, 2005, 5 pages.

Jingami, H., et al., "Structure of the metabotropic glutamate receptor," *Curr. Opin. Neurobiol.* 13:271-278, Elsevier Science (2003).

Koga, K., et al., "Free Amino Acids, Carnosine and 5'-Inosinic Acid Contents in the Beef Loin and Beef Round," *Mem. Fac. Agr. Kagoshima Univ.* 23:121-129, (1987).

Komata, Y., "Umami Taste of Seafoods," *Food Rev. Intl.* 6:457-487, Marcel Dekker, Inc. (1990).

Kuramitsu, R., Quality Assessment of a Low-Salt Soy Sauce Made of a Salty Peptide or Its Related Compounds, *Adv. Exp. Med. Biol.* 542:227-238, KluwerAcademic/Plenum Publishers (2004).

Kuramitsu, R., et al., "Tastes Produced by Peptides Containing Ionic Groups and by Related Compounds," *Biosci. Biotech. Biochem.* 60:1637-1642, Japan Society for Bioscience, Biotechnology, and Agrochemistry (1996).

Lee, K.-H., et al., "Seasonal Variations of Taste Components in Warty Sea Squirt (*Styela clava*)," *J. Korean Soc. Food. Nutr.* 24:274-279, Mary Ann Liebert, Inc. Publishers (1995).

Maehashi, K., et al., "Isolation of Peptides from an Enzymatic Hydrolysate of Food Proteins and Characterization of Their Taste Properties," *Biosci. Biotechnol. Biochem.* 63:555-559, Japan Society for Bioscience, Biotechnology, and Agrochemistry (1999).

McGregor, R., "Taste Modification in the Biotech Era," *FoodTechnology* 58:24-30, Institute of Food Technologists (May 2004).

McGregor, R.A. and Gravina, S.A., "Studies on the blocking of bitter taste," Presented at the *Association of ChemoReceptor Sciences Meeting* (2001).

Michikawa, K. and Konosu, S., "Sensory Identification of Effective Components for Masking Bitterness of Arginine in Synthetic Extract of Scallop," presented at the *Olfaction and Taste XI Proceedings of the 11th International Symposium on Olfaction and Taste and of the 27th Japanese Symposium on Taste and Smell*, Jul. 12-16, 1993, Springer-Verlag, p. 278 (1994).

Ming, D., et al., Blocking taste receptor activation of gustducin inhibits gustatory responses to bitter compounds, *Proc. Natl. Acad. Sci. USA 96*:9903-9908, The National Academy of Sciences (1999).

Mojet, J., et al., "Effect of Concentration on Taste-Taste Interactions in Foods for Elderly and Young Subjects," *Chem. Senses 29*:671-681, Oxford University Press (2004).

Nakata, T., et al., "Role of Basic and Acidic Fragments in Delicious Peptides (Lys-Gly-Asp-Glu-Glu-Ser-Leu-Ala) and the Taste Behavior of Sodium and Potassium Salts in Acidic Oligopeptides," *Biosci. Biotech. Biochem. 59*:689-693, Japan Society for Bioscience, Biotechnology, and Agrochemistry (1995).

Communication from ConAgra Foods, Inc. to the Food and Drug Administration Regarding Food Labeling; Nutrient Content Claims, Definitions of Sodium Levels For The Term "Healthy" Docket Nos. 91N-304H and 96P-0500, pp. 1-9, mailed Nov. 30, 2004.

Noguchi, M., et al., "On the Bitter-Masking Activity of a Glutamic Acid-Rich Oligopeptide Fraction," *J. Food. Sci. 40*:367-369, Institute of Food Technologists (1975).

"NutritionData Food Additive Identifier," accessed online at http://nutritiondata.com/food-additives.html on Jun. 6, 2005, 25 pages.

Ohyama, S., et al, "Synthesis of Bitter Peptides Composed of Aspartic Acid and Glutamic Acid," *Agric. Biol. Chem. 52*:871-872, The Agricultural Chemical Society of Japan (1988).

"Salt-Free Salt," *Nutrition Rev. 43*:337-338, Nutrition Foundation (1985).

Schiffman, S.S., et al., "Effect of the Nucleoside Analogs Zidovudine, Didanosine, Stavudine, and Lamivudine on the Sense of Taste," *Nutrition 15*:854-859, Elsevier Science Inc. (1999).

Schiffman, S.S., et al., "Modulators of the Adenylate Cyclae System Can Alter Electrophysiological Taste Responses in Gerbil," *Pharm. Biochem. Behavior 48*:983-990, Elsevier Science Inc. (1994).

Seki, T., et al., "Further Study on the Salty Peptide Ornithyl-β-alanine. Some Effects of pH and Additive Ions on the Saltiness," *J. Agric. Food. Chem. 38*:25-29, American Chemical Society (1990).

Shiau, C.-Y., et al., "Extractive Nitrogenous Components of Oysters (*Crassostrea virginica*) and Their Released Liquors," *J. Fish. Soc. Taiwan 21*:281-291, Fisheries Society of Taiwan (1994).

Shirai, T., et al., "Taste Components of Japanese Spiny and Shovel-Nosed Lobsters," *Fisheries Science 62*:283-287, Blackwell Publishing (1996).

"Spices & Seasonings," McCormick Product Line Spices & Seasonings, accessed online at http://www.mccormick.com/content.cfm?id=7001 and http://www.mccormick.com/content.cfm?id=7056 on Jun. 2, 2005, 2 pages.

Tada, M., et al., "L-Orinthyltaurine, a New Salty Peptide," *J. Agric. Food Chem. 32*:992-996, American Chemical Society (1984).

Tamura, M., et al., "An Enhancing Effect on the Saltiness of Sodium Chloride of Added Amino Acids and Their Esters," *Agric. Biol. Chem. 53*:1625-1633, The Agricultural Chemical Society of Japan (1989).

Tamura, M., et al., "Mechanism for the Bitter Tasting Potency of Peptides Using *O*-Aminoacyl Sugars as Model Compounds," *Agric. Biol. Chem. 54*:1401-1409, Japan Society for Bioscience, Biotechnology, and Agrochemistry (1990).

Tamura, M., et al., "Practical Debittering Using Model Peptides and Related Compounds," *Agric. Biol. Chem. 54*:41-51, Japan Society for Bioscience, Biotechnology, and Agrochemistry (1990).

Tamura, M., et al., "Structural Correlation between Some Amides and a Taste Receptor Model," *J. Agric. Food Chem. 37*:737-740, American Chemical Society (1989).

Tamura, M., et al., "The Relationship between Taste and Primary Structure of "Delicious Peptide" (Lys-Gly-Asp-Glu-Glu-Ser-Leu-Ala) from Beef Soup," *Agric. Biol. Chem. 53*:319-325, The Agricultural Chemical Society of Japan (1989).

*The Merck Index: An Encyclopedia of Chemicals, Drugs, and Biologicals*, 12th Ed., Budavari, S., et al., eds., Merck Research Laboratories, pp. 456, 779-780, 854, and 1553 (1996).

Xu, H., et al., "Different functional roles of T1R subunits in the heteromeric taste receptors," *Proc. Natl. Acad. Sci. Early Edition* pp. 1-6, The National Academy of Sciences, published online at www.pnas.org/cgi/doi/10.1073/pnas.0404384101 (2004).

Yamaguchi, S., "Basic Properties of Umami and Effects on Humans," *Phys. Behavior 49*:833-841, Pergamon Press (1991).

Yamaguchi, S. "The Synergistic Taste Effect of Monosodium Glutamate and Disodium 5'-Inosinate," *J. Food Sci. 32*:473-478, Institute of Food Technologists (1967).

Yang, S.-T. and Lee, E.-H., "Taste Compounds of Fresh-Water Fishes," *Bull. Korean Fish. Soc. 17*:170-176, Pusan: Han'guk Susan Hakhoe (1984).

International Search Report for International Application No. PCT/US99/30610, European Patent Office, mailed Jul. 17, 2000.

Co-pending U.S Appl. No. 11/155,745, inventors Salemme, F.R., et al., filed Jun. 20, 2005 (Not Published).

COMPOSITIONS AND METHODS FOR PRODUCING FLAVORED SEASONINGS THAT CONTAIN REDUCED QUANTITIES OF COMMON SALT

BACKGROUND OF THE INVENTION

1. Field of the Invention

The invention relates to reduced sodium flavored seasoning compositions for chips and other fried or baked snacks, popcorn, or other foods where a flavored seasoning is used. More specifically, the present invention relates to flavored seasonings and food compositions comprising (a) a seasoning mixture and (b) a salt substitute. The seasoning mixture comprises a flavoring agent and other ingredients. The salt substitute comprises potassium chloride and bitterness inhibitors that reduce the bitter taste, and increase the salty taste, of potassium chloride used in foods as a substitute for sodium chloride. Furthermore, the present invention relates to methods of using these flavored seasoning and food compositions and methods for preparing them.

2. Background Art

The sensation of taste has a profound biological significance with ramifications beyond providing people with pleasurable culinary experiences. Taste conveys many cues to humans and other animals. For example, the ability to taste allows us to identify tainted or spoiled foods, and provides satisfying responses that may be proportionate to caloric or nutritive value.

There are generally considered to be five categories of taste: sweet, sour, bitter, salty and umami (savory) (McGregor, R., *Food Technol.* 58(5):24-30 (2004)). These can be sub-classified as the appetitive tastes salty, sweet and umami, and the aversive tastes bitter and sour. The appetitive tastes are pleasurable and are associated with nutrient-containing foods. The aversive tastes may be elicited by toxic compounds, and thereby protect an animal by discouraging the ingestion of unhealthy or dangerous foods. Each of these tastes results from substances that may be referred to as "tastants."

A well known salty tastant is sodium chloride (i.e., common table salt, NaCl). Sodium chloride is found in many different types of foods, condiments and beverages. Sodium chloride is also added to foods, condiments and beverages to make them more enjoyable. Unfortunately, excessive intake of sodium can increase the risk of high blood pressure and heart disease. Despite recommendations from the National Institutes of Health that persons should consume no more than 2400 mg of sodium per day, surveys show that Americans greatly exceed this amount. In fact, Americans consume more than double the recommended amount per day. This fact has prompted efforts to develop salt substitutes that contain a reduced amount of sodium.

One approach is to substitute potassium chloride as a saltening agent either partially, or wholly, for sodium chloride (Kuramitsu, R. *Advances in Exp. Med. Biol.*, 542:227-238 (2004)). There are potassium chloride products on the market, such as Cardia Salt®, No Salt®, Morton Salt Substitute® (U.S. Pat. No. 3,505,082), and AlsoSalt® (U.S. Pat. No. 5,897,908). Many of these products include agents, such as L-lysine, to modify or mask the unpleasant taste of potassium chloride.

Recent nutritional guidelines not only suggest that the amount of sodium in the diet (ingested principally as sodium chloride) should be reduced, but that the amount of potassium in the diet should be increased. (Colorado State University Cooperative Extension-Nutrition Resources: Fact Sheet No. 9.355 "Potassium and Health" by J. Anderson, et al. (accessed May 15, 2005)). Potassium is involved in nerve function, muscle control and blood pressure. An insufficient potassium level in the body may, for example, cause muscle cramping during exercise, or cardiovascular irregularities. Id.

Consequently, substituting dietary potassium chloride for sodium chloride could provide at least two health benefits. First, it would reduce sodium intake, which could decrease risk of hypertension and associated heart disease. Second, it would increase potassium intake, which is below recommended levels in most modern diets. Despite these benefits, substituting potassium chloride for sodium chloride faces a major obstacle because potassium has a strong bitter taste.

Another obstacle to the development of a palatable potassium chloride salt substitute is the requirement that flavorings added to food or beverages meet Flavor and Extract Manufacturers Association, Generally Recognized as Safe (FEMA GRAS) guidelines or be approved by the U.S. Food and Drug Administration. Substances that might be used to inhibit the bitter taste of potassium must meet these guidelines. The use of bitterness inhibitors not already accepted by FEMA GRAS present increased development costs and delayed market entry for food and beverage companies trying to develop better salt substitutes, and flavored seasoning compositions containing them.

Attempts to eliminate the bitter taste of potassium chloride have taken two distinct approaches. One is to use "maskers" to cover the bitter taste. These maskers are highly flavorful ingredients such as onion, garlic, paprika, red pepper, chili powder, and other spices. None of these mixtures have found wide-spread acceptance, probably because the bitter taste of potassium is still detectable. The second approach is to use compounds that reduce the bitter taste of potassium without imparting another unpleasant taste. U.S. Pat. No. 5,631,299, Kurtz et al., discloses that taurine may reduce the bitter taste of potassium chloride without producing another unpleasant taste, if used in the right amount. (See U.S. Pat. No. 5,631,299, which is incorporated by reference in its entirety).

Methods for identifying compounds that reduce bitter taste (e.g., the inhibition of activation of taste receptors) have been described by Margolskee et al. in U.S. Pat. No. 6,540,978, which is incorporated by reference in its entirety. Such methods have resulted in the identification of compounds such as 5'-adenosinic acid (AMP) and 5'-inosinic acid (IMP) as potential "bitterness inhibitors."

Other examples of compounds proposed for use in a salt substitute to reduce or mask the bitter taste of potassium chloride include fumaric acid (U.S. Pat. No. 3,505,082), lactose and/or dextrose and cream of tartar (U.S. Pat. No. 3,860,732), potassium phosphate (U.S. Pat. No. 4,243,691) autolyzed yeast (U.S. Pat. No. 4,297,375), lysine monohydrochloride (U.S. Pat. No. 5,897,908), and specific combinations of sulfate-containing and chloride containing salts (U.S. Pat. No. 6,541,050).

Existing approaches for blocking the bitterness of potassium in salt substitutes have been unsuccessful because they do not reduce bitterness to a level satisfactory to consumers. Therefore, the undesirable bitter taste of potassium chloride remains a problem. In fact, some major food and beverage companies have objected to regulations that would lower the maximum amount of sodium allowed in foods labeled healthy, because consumers would not find these foods palatable, and viable substitutes for sodium chloride are unavailable. (See comments by ConAgra Foods to the FDA on Nov. 30, 2004 and by Quaker Foods & Beverages to the FDA on Jul. 10, 2003 regarding the FDA proposed regulations for a more restrictive sodium level).

BRIEF SUMMARY OF THE INVENTION

The present invention provides reduced sodium flavored seasoning compositions for foods. These flavored seasoning compositions, or food compositions containing them, comprise a) a seasoning mixture comprising flavoring agents and other ingredients, and b) a salt substitute comprising potassium chloride (KCl) and bitterness inhibitors. These inhibitors comprise mixtures of taurine, or a physiologically acceptable salt thereof, with a 5'-nucleotide monophosphate comprising 5'-adenosinic acid (AMP), 5'-inosinic acid (IMP), combinations of AMP and IMP, combinations of AMP, IMP and 5'-guanylic acid (GMP), or physiologically acceptable salts thereof. The invention also includes methods of using the flavored seasoning compositions and foods, and to methods of manufacturing these compositions and foods.

By providing an enjoyable reduced sodium flavored seasoning composition as an alternative for existing seasonings that contain sodium chloride, the invention allows individuals to decrease sodium intake and increase potassium intake, leading to a healthier diet.

The present invention overcomes the disadvantages of existing flavored seasoning and foods containing them, because the compositions of the present invention significantly reduce the amount of sodium in such compositions while retaining the same degree of salty taste.

Another benefit of the invention is that it provides a cheaper alternative to flavored seasoning compositions salted with KCl that would rely only on AMP to reduce bitterness. Particularly, the present invention requires less AMP than compositions in which AMP is the only bitterness inhibitor, because the present invention supplements or replaces AMP with taurine and other 5'-nucleotide monophosphates. Because AMP is significantly more expensive than taurine and than other 5'-nucleotide monophosphates such as IMP and GMP, the present invention provides a flavored seasoning composition or food seasoned with it that is not only palatable but economical.

Moreover, KCl, taurine, AMP, IMP and GMP are already accepted as meeting Flavor and Extract Manufacturers Association, Generally Recognized as Safe (FEMA GRAS) guidelines.

The present invention provides a flavored seasoning composition comprising (a) a seasoning mixture comprising a flavoring agent, a flow agent, a binding agent, and (b) a salt substitute, wherein the salt substitute comprises potassium chloride, taurine or a physiologically acceptable salt thereof, and 5'-adenosinic acid (AMP) or 5'-inosinic acid (IMP), or physiologically acceptable salts thereof. The seasoning mixture may also contain a binding agent, a carrier, a bulking agent, a carrier agent and a preservative. The salt substitute may also contain combinations of AMP and IMP or combinations of AMP, IMP and GMP.

The present invention also provides such a composition where the flavoring agent(s) is selected from the group consisting of a cheese flavoring, a meaty flavoring, an alliaceous flavoring, a tangy flavoring, a spicy flavoring, or combinations thereof.

The present invention also provides such a composition where the cheese flavoring is selected from the group consisting of nacho, cheddar, white cheddar, blue, mozzarella, asiago, american, brick, brie, feta, italian, monterey jack, muenster, provolone, ricotta, romano, swiss, taco or parmesan.

The present invention also provides a composition comprising the flavored seasoning, wherein the composition is a snack (pretzel, popcorn, pizza, cracker, curl, puff, doodle, a potato chip, tortilla chip, corn chip), sauce, corn, pasta or dog biscuit.

The present invention further provides a composition comprising a flavoring agent between about 60% and about 99%, a flow agent up to about 2%, a binding agent up to about 30%, and a salt substitute between about 1% and about 5%, w/w of the composition.

Also, the present invention provides a composition comprising taurine between about 2% and about 15%, AMP between about 1% and about 8%, IMP up to about 4% and GMP up to about 4, w/w of the salt substitute.

In addition, the present invention provides a composition comprising (a) a seasoning mixture comprising a cheese flavoring agent, a tangy flavoring agent, an alliaceous flavoring agent, a flow agent and a binding agent and (b) a salt substitute comprising potassium chloride, taurine, and a 5'-nucleotide monophosphate, comprising AMP, IMP and GMP.

The present invention also provides a composition comprising a cheese flavoring agent between about 60% and about 90%, a tangy flavoring agent between about 1% and about 10% and an alliaceous flavoring agent up to about 10%, w/w of the composition.

The invention also provides a method of reducing sodium intake and increasing potassium intake in the diet of an individual, comprising administering to the individual the flavored seasoning compositions or foods of the invention.

Another aspect of the invention is a method for preparing the flavored seasoning compositions of the invention comprising mixing the salt substitute with the seasoning mixture.

Another aspect of the present invention is a method for preparing the compositions of the invention comprising adding to the food the seasoning mixture, or individual ingredients of the seasoning mixture, and the salt substitute, in no particular order.

DETAILED DESCRIPTION OF THE INVENTION

The present invention provides flavored seasoning compositions, for use in foods, the compositions comprising a seasoning mixture comprising a flavoring agent, a flow agent and a binding agent, and salt substitute comprising KCl, taurine or a physiologically acceptable salt thereof, and a 5'-nucleotide monophosphate selected from the group consisting of AMP, IMP, combinations of AMP and IMP and physiologically acceptable salts thereof. The combinations may also contain GMP or a physiologically acceptable salt thereof. The invention also includes methods for using such compositions, and methods of manufacturing the compositions of the invention.

The invention also includes foods containing the seasoning mixture and salt substitute. The flavored seasoning mixture may be added to food as an existing composition, or the individual ingredients of the seasoning mixture and salt substitute may be added separately.

The specification uses a number of terms from the food taste industry. To provide a clear and consistent understanding of the specification and claims, including the scope to be given such terms, the following definitions are provided.

The term "flavored seasoning composition" as used herein is a composition added to a food for the production of a desired flavor. This composition contains a seasoning mixture and a salt substitute.

The term "seasoning mixture" as used herein is a composition comprising all other ingredients and components besides the salt substitute that are used to prepare a flavored seasoning composition. Such ingredients include a flavoring agent, and may also include a bulking agent, flow agent, carrier agent, binding agent and preservative. For example, a seasoning mixture may be specifically a "cheese flavored seasoning mixture."

The term "flavoring agent" as used herein is an additive that gives food a particular taste or smell, and is derived from natural ingredients, or created artificially. It may include, but is not limited to, cheese (e.g., nacho, yellow cheddar, white cheddar, blue, mozzarella or parmesan), meaty (e.g., beef, steak, chicken, smoked, mesquite, barbeque, seafood), alliaceous and tangy (e.g., citric acid, vinegar, lemon and herb). For example, a flavoring agent may be a "cheese flavoring agent" or "meaty flavoring agent" or a combination of flavoring agents.

The term "salt substitute" as used herein is a composition of KCl, taurine or a physiologically acceptable salt thereof and a 5'-nucleotide monophosphate selected from the group consisting of AMP or IMP and/or GMP, mixtures thereof and physiologically acceptable salts thereof.

The term "taurine" as used herein is 2-aminoethanesulfonic acid or a physiologically acceptable salt thereof. This salt can be a sodium or non-sodium salt.

The term "5-nucleotide monophosphate" as used herein is 5'-inosinic acid (IMP), 5'-guanylic acid (GMP), and 5'-adenylic acid (AMP), physiologically acceptable salt(s) thereof, or mixtures of the acid(s) and/or salt(s). These salts can be sodium or non-sodium salts.

The term "food" as used herein is a composition to which a flavored seasoning composition containing a salt substitute may be added to reduce the amount sodium of the food but retain the salty taste. Such foods include, e.g., baked or fried snacks (e.g., pretzel, popcorn, pizza, cracker, curl, puff, doodle, a potato chip, tortilla chip, corn chip), sauce, corn, pasta, dog biscuit, etc.

The term "tastant" as used herein is a compound or molecular complex that induces, in a subject, the perception of taste. For example, a "bitter tastant" as used herein is defined as a compound or molecular complex that induces, in a subject, the perception of a bitter taste. Examples of bitter tastants include, but are not limited to, KCl, denatonium benzoate, quinine hydrochloride, strychnine hydrochloride, nicotine hemisulfate, atropine hydrochloride, sparteine, naringin, caffeic acid (caffeine), quinacrine, and epicatechin (See Ming et al., *Proc. Natl. Acad. Sci. U.S.A.* 96:9903-9908 (1999), incorporated by reference herein).

The term "tastand" as used herein is a compound that, when ingested at an appropriate concentration along with a tastant having an undesirable taste, will eliminate or substantially reduce the undesirable taste without inducing a taste of its own at its usage level. Examples of tastands that decrease or abrogate the perception of bitterness of bitter tastants are specifically termed "bitterness inhibitors." Examples of such bitterness inhibitors include, but are not limited to, taurine, AMP, IMP and GMP.

The term "umami" as used herein is defined as that flavor which is perceived as savory, such as is associated with meats, chicken broth and seasonings containing monosodium glutamate.

The term "amount effective" as used herein is the amount that subjectively, and significantly, affects the perception of taste as evaluated by the sensory analysis experiments described in the Examples below. The desired effects include, but are not limited to, a decrease in the perception of bitter taste, an increase in the perception of salty taste and an increase in the perception of umami or savory taste. The effectiveness of a composition is determined, e.g., by comparing scores given by a panel of taste testers for taste attributes such as bitterness, saltiness, and umami flavor, between two samples (e.g., reduced sodium nacho cheese flavored chips containing KCl+taurine+AMP vs. nacho cheese flavored chips containing NaCl).

The term "individual" as used herein is defined as a human or other mammal such as a cat or dog.

The term "administer" as used herein is defined as the ingestion of a composition of the present invention by an individual, alone or with the assistance of another.

The present invention includes a flavored seasoning composition comprising a seasoning mixture and salt substitute for use in a flavored food. The composition may comprise a seasoning mixture and a salt substitute comprising taurine, a 5'-nucleotide monophosphate and KCl.

The present invention may be used to improve the taste of salt substitutes or flavored foods containing KCl by decreasing or eliminating the bitter taste of KCl and increasing the salty taste of KCl.

If a bitter tastant is a preservative, the bitterness inhibitors of the invention may permit or facilitate its incorporation into flavored foods, thereby improving food safety. For flavored foods administered as nutritional supplements, the incorporation of the flavored seasoning compositions and salt substitutes with bitterness inhibitors may encourage ingestion, thereby enhancing the effectiveness of these compositions in providing nutrition or calories to a subject.

Any acceptable method for preparing the present compositions can be used. A composition of the present invention may be prepared by combining a seasoning mixture comprising a flavoring agent, flow agent, bulking agent, carrier agent, binding agent and preservative with a salt substitute comprising KCl, taurine or a physiologically acceptable salt thereof, and a 5'-nucleotide monophosphate or a physiologically acceptable salt thereof. The ingredients may be blended together or blended with the other ingredients of a flavored seasoning mixture before they are added to the food, or they each may be added separately to the food. The ingredients may be added in powder or liquid form.

The mixing ratio for the seasoning mixture and salt substitute can be adapted according to the purpose of use of the seasoning mixture and salt substitute. For example, the salt substitute may include common table salt (NaCl) in any ratio depending on the specific application and desired level of NaCl reduction in the final product. Thus, the terms low or reduced sodium and salt substitute include compositions that contain some sodium or no sodium.

In liquid foods like soup and sauces, the solids are added in the correct amounts and proportions to the liquid soup, sauce or other prepared foods. In salty snacks that are baked or fried, e.g., chips, puffs, and doodles, the ingredients of the flavored seasoning composition may be added individually or as the blended flavored seasoning composition to the other ingredients comprising the salty snack(s) prior to cooking. Alternatively, the ingredients of flavored seasoning compositions may be sprayed on previously cooked chips, puffs, and doodles, using water, oil, or some other compositions known to those skilled in the art to assist deposition of flavored seasoning composition on the surface of the salty snack. The ingredients of flavored seasoning composition may also be applied to previously cooked chips, puffs, and doodles by dusting or sprinkling the snacks with a dried granulated or powdered form of the flavored seasoning composition. To prepare a table top formulation, the ingredients may be mixed into a liquid in the correct proportions, together with non-caking or other agents commonly used in the food industry and known to those practicing the art of food formulation, and then dried and ground. Alternatively, the liquid mixture can be spray dried to form a powered solid suitable for tabletop applications and packaging as a solid salt replacement.

The present composition of the invention may be packaged as a flavored seasoning composition that includes a seasoning mixture and a salt substitute comprising KCl, taurine and a 5'-nucleotide monophosphate, or as a food comprising these ingredients. The composition may be packaged in bulk, in which the package contains more of the composition than would typically be used for a single dish or serving of food. Such bulk packages can be in the form of paper, plastic, or cloth bags or cardboard boxes or drums. Such bulk packages may be fitted with plastic or metal spouts to facilitate the dispensing of the composition.

Alternatively, the present compositions of the invention may be packaged in an amount that would be suitable for use at a single meal or with a single serving of food. Suitable packaging materials for such individual serving packages include paper or foil packets or pouches.

The seasoning mixture may be present at a concentration from about 95% to about 99%, preferably about 96% to about 98%, more preferably about 97%, (weight of ingredient per total weight of composition (w/w)) of the flavored seasoning composition.

The seasoning mixture of the present invention contains a flavoring agent. Flavoring agents are additives that give food a particular taste or smell, and may derived from natural ingredients, or created artificially. The flavoring agent, or combinations thereof, may be present at a concentration between about 60% and about 99%, preferably between about 80% and about 90%, more preferably about 86%, w/w of the flavored seasoning composition.

These flavoring agents may include cheese flavoring agents, meaty flavoring agents, alliaceous flavoring agents, tangy flavoring agents and spicy flavoring agents.

Cheese flavoring agents are additives that give food a cheese taste or smell. The cheese flavor is made by enzymatic modification of cheese or dairy ingredients. This enzymatic modification yields a paste of very intense flavor that is dried with carriers such as maltodextrin. This technology is applied to cheeses including, but not limited to, cheddar, mild cheddar, aged cheddar, blue, Romano and parmesan. Commercially available cheese flavoring agents include, but are not limited to, Sequoia II™, Bluzing™, Romanotang™ and whey (e.g., farmers cheese whey). One or more cheese flavoring agents may be incorporated as part of the flavored seasoning mixture. The cheese flavoring agent may be present between about 60% and about 90%, preferably between about 75% and about 85%, and more preferably about 79.5%, w/w of the flavored seasoning composition. Each individual cheese flavoring agent may be present between about 1% and about 50% w/w of the flavored seasoning composition. For example, a cheese based cheese flavoring agent such as Sequoia II™ may be present at a concentration between about 30% and about 50%, preferably between about 35% and about 45%, more preferably about 40%, w/w of the flavored seasoning composition. A blue cheese based cheese flavoring agent such as Bluzing™ may be present at a concentration between about 1% and about 10%, preferably between about 3% and about 7%, more preferably about 5%, w/w of the flavored seasoning composition. A romano cheese based cheese flavoring agent such as Romanotang™ may be present at a concentration between about 5% and about 15%, preferably between about 8% and about 12%, more preferably about 10%, w/w of the flavored seasoning composition. Whey may be present at a concentration between about 20% and about 30%, preferably between about 23% and about 27%, more preferably about 25%, w/w of the flavored seasoning composition.

Meaty or savory flavoring agents are additives that give food a meaty taste or smell. They may include, but are not limited to, beef, chicken, lamb, fish, barbecued or smoke flavored meats, monosodium glutamate (MSG), glutamic acid, soy sauce, hydrolyzed soy, and reaction flavors derived from reaction of protein with carbohydrates at high temperatures to reproduce savory flavors. One or more meaty flavoring agents may be incorporated as part of the seasoning mixture. Each meaty flavoring agent may be present between about 1% and about 50% w/w of the flavored seasoning composition.

Tangy flavoring agents are additives such as food acids that give food a tart or sour or "sharp" taste or smell. These food acids may include, but are not limited to, acetic acid, citric acid, tartaric acid, malic acid, fumaric acid, lactic acid and nonorganic acids such as phosphoric acid. One or more tangy flavoring agents may be incorporated as part of the seasoning mixture. A tangy flavoring agent (e.g., citric acid) may be present at a concentration between about 1% and about 10%, preferably between about 3% and about 7%, more preferably about 3.5%, w/w of the flavored seasoning composition. Tangy flavoring agents such as these aforementioned acids may also act as preservatives and antioxidants.

Alliaceous flavoring agents are additives that give food an onion or garlic taste or smell. They may include, but are not limited to, onion powder garlic powder, chives, leeks, scallions and shallots. One or more alliaceous flavoring agents may be used as part of the seasoning mixture. An alliaceous flavoring agent may be present at a concentration up to about 10%, preferably up to about 5%, more preferably up to about 3%, w/w of the flavored seasoning composition. For example, onion powder may be present at a concentration up to about 5%, preferably between about 1% and about 3%, more preferably 2%, w/w of the flavored seasoning composition. Garlic powder may be present at a concentration up to about 5%, preferably about 1%, w/w of the flavored seasoning composition.

Spicy flavoring agents are additives that give food a pungent taste or smell. They may include, but are not limited to, pepper, cinnamon, nutmeg, ginger, allspice, mace, cloves, pepper (e.g., cayenne, jalapeno, chipotle, chili), peppercorns, mustard, oregano, chives, anise, basil, black pepper and cilantro. One or more spicy flavoring agents may be used as part of the seasoning mixture. For example, chili pepper powder may be present at a concentration up to about 5%, preferably between about 1% and about 3%, more preferably 2%, w/w of the flavored seasoning composition.

Another ingredient used in the seasoning mixture of the present invention is a bulking agent. Bulking agents are additives used to increase the volume of a composition. One or more bulking agents may be used as part of the seasoning mixture. This bulking agent may include, but is not limited to, whey, cellulose, dextrose, lactose, maltodextrin methylcellulose, xantham gum, sugar alcohols (e.g., maltitol, sorbitol, mannitol, xyltol) and polyvinylpyrrolidone. A bulking agent (e.g., whey) may be present at a concentration between about 20% and about 30%, preferably between about 23% and about 27%, more preferably about 24.5%, w/w of the flavored seasoning composition. The ingredients used in the compositions of the invention may serve multiple purposes within the present invention. For example, whey is a bulking agent and a cheese flavoring agent.

The seasoning mixture of the present invention may also contain flow agents. Flow agents help ingredients move smoothly from one location to another during manufacture. In addition, these agents act as anticaking agents reducing the hygroscopicity of the mixture and making the powder more resistant to exposure to humid environment. One or more flow agents may be used as part of the seasoning mixture. They may include, but are not limited to, silicon dioxide (e.g., Sylox 15™), calcium stearate, glyceryl monostearate and glyceryl triacetate. A flow agent (e.g., silicon dioxide) may be present at a concentration up to about 2%, preferably about 1%, w/w of the flavored seasoning composition.

In addition, the seasoning mixture of the present invention may contain a binding agent. Binding agents are substances that makes a loose mixture stick together. One or more binding agents may be used as part of the seasoning mixture. They may include, but are not limited to, dextrose, starch, cellulose, dextrin and glycerin. A binding agent (e.g., dextrose) may be present at a concentration up to about 30%, preferably between about 5% and about 15%, more preferably about 10%, w/w of the flavored seasoning composition.

Another ingredient of the seasoning mixture may be a carrier agent. Carrier agents are substances that aid the uniform distribution, mixing, and handling of other ingredients. Often, carrier agents include ingredients that have other functions besides aiding in the uniform distribution, mixing and handling of other ingredients. For example, a bulking agent such as dextrose may also be considered a carrier agent. One or more carrier agents may be used as part of the seasoning mixture. They may include, but are not limited to, cellulose (e.g., powdered, microcrystalline, ethyl), citric acid, dextrose, fructose, magnesium carbonate, polyethlyene glycol, polydextroses, polyoxyethylene sorbitan, polyvinylpyrrolidone and silicon dioxide. A carrier agent may be present at a concentration up to about 30%, preferably between about 5% and about 15%, more preferably about 10%, w/w of the flavored seasoning composition.

The seasoning mixture of the present invention may also contain preservatives. Preservatives prevent or inhibit spoilage of food due to fungi, bacteria and other microorganisms. One or more preservatives may be used as part of the seasoning mixture. They may include, but are not limited to, preservatives such as sodium benzoate, sorbic acid and its salts thereof, and lauric arginate. One or more preservatives may be part of the seasoning mixture and present at a concentration up to about 2% w/w of the flavored seasoning composition.

The seasoning mixture may also contain other ingredients commonly found in seasonings added to foods.

The salt substitute in the flavored seasoning composition of the present invention comprises KCl, taurine or a physiologically acceptable salt thereof, and a 5'-nucleotide monophosphate or a physiologically acceptable salt thereof. The salt substitute may be present at a concentration between about 1% and about 5%, preferably between about 2% and about 4%, more preferably about 3%, w/w of the flavored seasoning composition.

Typically, the salt substitute of the present invention will be added to the food or seasoning mixture to provide an amount of KCl that is approximately the same weight amount as the NaCl that is being replaced. For example, the amount of KCl in the food after the salt substitute is added may range from about 0.5 to about 1.5 times the replaced NaCl depending upon the application, i.e., if about 0.5 mg of NaCl is removed, about 0.25 to about 0.75 mg of KCl is added. The amounts of NaCl conventionally used to season various food products are well known to those of skill in the art and need not be recited.

The amount of KCl added to a composition will vary depending on the amount of perceived saltiness desired and other compounds present in the composition. For example, KCl may be present at a concentration between about 0.5% and about 1.5%, preferably about 0.9% (about 9000 ppm), w/w of the food.

Another ingredient employed in the salt substitute of the present invention is taurine or a physiologically acceptable salt thereof. The amount of taurine or a physiologically acceptable salt thereof added to a composition comprising a bitter tastant will vary depending on the amount of bitter tastant present and other compounds present in the composition. For example, taurine may be present at a concentration of between about 1% and about 15% w/w KCl. Preferably, the food composition comprises between about 400 and about 1200 ppm of taurine, more preferably about 750 ppm of taurine.

An additional ingredient used in the salt substitute of the present invention is a 5'-nucleotide monophosphate, AMP, IMP, GMP, combinations thereof or physiologically acceptable salts thereof. The amount of 5'-nucleotide monophosphate or a physiologically acceptable salt thereof added to a composition comprising a bitter tastant will vary depending on the amount of bitter tastant present and other compounds present in the composition. For example, the 5'-nucleotide monophosphate AMP may be present at a concentration between about 1% and about 9% w/w KCl. Preferably, the concentration in a food is between about 100 and about 800 ppm of AMP, more preferably between about 400 ppm and about 600 ppm of AMP. The 5'-nucleotide monophosphates IMP and/or GMP may be present at a concentration up to about 8% w/w KCl. Preferably, the concentration in a food is up to about 600 ppm of IMP, more preferably between about 100 ppm and about 200 ppm of IMP, and/or up to about 600 ppm of GMP, more preferably between about 100 ppm and about 200 ppm of GMP.

In a preferred embodiment of the claimed invention, a flavored seasoning composition comprises between about 95% and about 99% seasoning mixture and between about 1% and about 5% salt substitute, w/w of the composition.

A more preferred embodiment of the claimed invention is a flavored seasoning composition that comprises between about 96% and about 98% seasoning mixture and between about 2% and about 4% salt substitute, w/w of the composition.

Yet, an even more preferred embodiment of the claimed invention is a flavored seasoning composition that comprises about 97% seasoning mixture and about 3% salt substitute, w/w of the composition.

In a preferred embodiment of the claimed invention, the composition comprises a cheese flavored seasoning mixture and salt substitute, wherein the cheese flavored seasoning mixture comprises between about 30% and about 50% Sequoia II™, between about 1% and about 10% Bluzing™, between about 5% and about 15% Romanotang™, up to about 30% dextrose, up to about 5% onion powder, up to about 5% garlic powder, up to about 10% citric acid, up to about 2% silicon dioxide and between about 20% and about 30% whey, w/w of the composition.

An additional preferred embodiment of the claimed invention comprises a cheese flavored seasoning mixture, wherein the mixture is comprised of between about 35% and about 45% Sequoia II™, between about 3% and about 7% Bluzing™, between about 8% and about 12% Romanotang™, between about 5% and about 15% dextrose, between about 1% and about 3% onion powder, about 1% garlic powder, between about 3% and about 7% citric acid, about 1% silicon dioxide and between about 23% and about 27% whey, w/w of the composition.

Yet, a more preferred embodiment of the claimed invention comprises a cheese flavored seasoning mixture, wherein the mixture is comprised of about 40% Sequoia II™, about 5% Bluzing™, about 10% Romanotang™, about 10% dextrose, about 2% onion powder, about 1% garlic powder, about 3.5% citric acid, about 1% silicon dioxide and about 24.5% whey, w/w of the composition.

A preferred embodiment of the claimed invention is a composition comprising a seasoning mixture and salt substitute, wherein the salt substitute is comprised of between about 80% and about 98% KCl, between about 2% and about 15% taurine, between about 1% and about 8% AMP, up to about 4% IMP, and up to about 4% GMP, w/w of the salt substitute. These percentages are based on the amounts of these ingredients relative to the total weight of all of these ingredients.

In another preferred embodiment of the claimed invention, a composition is comprised of a seasoning mixture and salt substitute, wherein the salt substitute is comprised of between about 83% and about 87% KCl, between about 6% and about 8% taurine, between about 3% and about 6% AMP, up to about 3% IMP and up to about 3% GMP, w/w of the salt substitute. These percentages are based on the amounts of these ingredients relative to the total weight of all of these ingredients.

In a preferred embodiment of the claimed invention, a composition is comprised of a seasoning mixture and salt substitute, wherein the salt substitute is comprised of about 86.95% KCl, about 3.86% AMP (monosodium salt of adenosinic acid), about 7.25% taurine, about 0.97% IMP (disodium salt of inosinic acid) and about 0.97% GMP (disodium salt of guanylic acid), w/w of the salt substitute.

EXAMPLES

The following Examples are illustrative, but not limiting, of the compositions and methods of the present invention. Modifications of these examples according to conditions and parameters normally encountered in taste biology and chemistry that are obvious to those skilled in the art, in view of the present disclosure, are within the spirit and scope of the invention.

Example 1

Cheese Flavored Potato Chips

Materials and Methods

Nacho cheese flavored potato chips containing a reduced sodium or a full sodium cheese flavored seasoning, respectively, were prepared and tasted. The taste attributes of these potato chips were compared.

Unsalted potato chips (Herr's® No Salt) were obtained locally from a commercial supermarket. Sequoia II™, Bluzing™ and Romanotang™ were obtained from Kraft Foods. Dextrose 2001 was obtained from Corn Products International. Onion and garlic powders were obtained from Newly Wed Foods. Citric acid FG (food grade) was obtained from Penta. Sylox 15 was obtained from Grace (Davison Division). Farmers' Cheese Whey was obtained from Dairy Farmers of America.

Nacho cheese flavored seasoning Formulations A and B containing flour salt (food grade sodium chloride) or a salt substitute, respectively, were prepared at ABIC International Consultants, a sensory evaluation contract research group in Fairfield, N.J. For both formulations, the cheese mixture ingredients and Sylox were blended using a KitchenAid® mixer and paddle until well blended. The remaining ingredients were then added and blended thoroughly. The amount of each ingredient, specified as % w/w of the composition, is described in Table 1, below.

Approximately 40 grams of unsalted potato chips were placed in each of two separate plastic bags. Approximately 8.6 grams of Formulation A was added to one plastic bag and approximately 8.6 grams of Formulation B was added to the other plastic bag. The two plastic bags were shaken with the enclosed chips to distribute the seasoning mixes uniformly on the chip surfaces. Individual chips were then removed for taste testing.

Both mixes of chips with their respective formulations were tasted by seven individuals employed at Linguagen Corp. in a blinded taste test. These individuals comprised a panel of representative consumers. Each individual taste tester drank water between the tasting of each formulation. Each mix was evaluated qualitatively for its flavor acceptability, and perceptions of bitterness and saltiness.

TABLE 1

Nacho Cheese Flavored Seasoning Formulations A and B

| Ingredients | Formulation A (%) | Formulation B (%) |
|---|---|---|
| Sequoia II ™ | 40.0 | 40.0 |
| Bluzing ™ | 5.0 | 5.0 |
| Romanotang ™ | 10.0 | 10.0 |
| Dextrose 2001 | 10.0 | 10.0 |
| Onion Powder | 2.0 | 2.0 |
| Garlic Powder | 1.0 | 1.0 |
| Citric Acid FG | 3.5 | 3.5 |
| Sylox 15 | 1.0 | 1.0 |
| Farmers Cheese Whey | 24.5 | 24.5 |
| Salt or salt substitute* | 3.0 (flour salt) | 3.0 (salt substitute) |

*The only difference between cheese flavored seasoning Formulations A and B is the type of salt present in the formulation. Formulation A contains 3.0% flour salt (food grade sodium chloride). Formulation B contains 3.0% salt substitute that comprises about 86.95% KCl, about 7.25% taurine, about 3.86% AMP, about 0.97% IMP and about 0.97% GMP, of the salt substitute. Therefore, the amount of sodium contained in a portion of each seasoning is different.

Results

Qualitative Taste Comparisons of Formulations A and B

A 40 g portion of unsalted chips flavored with approximately 8.6 g of Formulation A seasoning containing flour salt had approximately 266 mg of total sodium. This amount of sodium is derived mainly from the flour salt (about 102 mg), cheese flavorings and cheese whey (about 150 mg), with a small amount of sodium coming from the chips (about 14 mg).

However, the same portion of chips (40 g) flavored with approximately 8.6 g of Formulation B seasoning had only about 165 mg of total sodium because all of the added flour salt (102 mg) in Formulation A had been replaced by the salt substitute in Formulation B. The amount of sodium contributed by the monosodium salt of AMP and disodium salts of IMP and GMP of the salt substitute was negligible (about 1 mg). Thus, compared to the chips seasoned with Formulation A, the amount of sodium in chips seasoned with Formulation B is reduced by approximately 38%.

All individuals who tasted both formulations found them to be practically equivalent in flavor acceptability. In particular, the tasters perceived almost none of the bitterness usually associated with KCl, and the overall perception was a salty taste. Thus, the cheese flavored seasoning formulation containing the KCl salt substitute overcame the bitterness of the KCl while providing a salty taste as pleasing as that of the cheese flavored seasoning formulation containing a full dose of NaCl with no KCl.

Example 2

Dosing Study for Salt Substitute

Introduction

A dosing study was performed by a panel of taste testers to analyze the taste of various combinations of KCl, taurine and a 5'-nucleotide monophosphate for use as a salt substitute. While the salt substitute combinations were tested as an ingredient in part of chicken broth, the test results can apply to flavored seasoning compositions.

Materials and Methods for Sensory Analysis

Reduced sodium chicken broth (50% Reduced Sodium, College Inn®) was obtained from a local supermarket. Taurine was obtained as a commercial food ingredient from Ajinomoto (it may also be obtained from Gallard-Schlesinger). AMP was obtained as a commercial food ingredient from Xinxiang Tuoxin Biochemical Technology & Science Co., Ltd. IMP and GMP were obtained from Ajinomoto as a 50/50 mixture called Ribotide®. KCl and NaCl were obtained from Morton Salt Co. as commercial food ingredients. Ingredients were added as dry powders to the canned soup product College Inn® Reduced Sodium Chicken Broth (obtained from the supermarket) in the correct amounts and proportions to achieve the desired final concentrations in the broth specified (as a % w/w or ppm) in Table 2.

College Inn® Reduced Sodium Chicken Broth contains approximately 50% of the NaCl that is typically present in fully salted chicken broth products. All chicken broth samples were fortified with 0.9% KCl. Various combinations of taurine (750 ppm), AMP (600 ppm) and IMP (200 ppm) were added to the fortified chicken broth as described in Table 2.

ABIC (Fairfield, N.J.) convened an expert taste panel of 18 individuals selected for their taste acuity, particularly with regard to bitterness level. Samples of chicken broth with different dosing combinations of taurine, AMP, IMP and GMP were given to a panel of 18 experienced taste testers.

Methods for qualifying and quantifying the different types of tastes of sample compositions have been described in publications. Such methods are often referred to as sensory testing or sensory analysis. Typically, a panel of experienced taste testers evaluate sample compositions and assign a numeric value to each composition, based on their perceptions of the type and intensity of the tastes.

Samples were prepared in a preparation lab at ABIC and were presented to the judges labeled only with triple digit random number codes. The soup was served to the judges at 160° F. Samples were presented to the judges sequentially with a rest period of at least 15 minutes between samples. To eliminate bias, the order of sample presentation was randomized. Judges were provided with unsalted crackers and water between samples.

The taste panel evaluated the intensity of the samples for the attributes of perceived saltiness, chicken (umami) flavor, and bitterness. The evaluation range for the attributes was 0 (none) to 8 (very salty), 0 (none) to 8 (very strong), and 0 (none) to 8 (very bitter), respectively. Scores from all 18 taste testers for each attribute were averaged for each sample. The compositions of the broth samples and average scores for each are presented in Table 2.

TABLE 2

Dosing Studies

| Sample No. | Groups | NaCl (ppm) | KCl (ppm) | AMP (ppm) | Taurine (ppm) | IMP (ppm) | GMP (ppm) | Count | Salt (0–8) | Chicken (0–8) | Bitter (0–8) |
|---|---|---|---|---|---|---|---|---|---|---|---|
| Control 1 | Full Salt (NaCl) | 38750 | 0 | 0 | 0 | 0 | 0 | 18 | 4.11 | 3.56 | 0.44 |
| Control 2 | KCl | 18750 | 9000 | 0 | 0 | 0 | 0 | 18 | 2.11 | 1.89 | 2.83 |
| 1 | KCl + taurine + AMP + IMP | 18750 | 9000 | 400 | 750 | 200 | 0 | 18 | 2.22 | 2.19 | 2.06 |
| 2 | KCl + taurine + AMP + IMP + GMP | 18750 | 9000 | 400 | 750 | 100 | 100 | 18 | 2.42 | 2.33 | 1.64 |
| 3 | KCl + taurine + AMP + IMP + GMP | 18750 | 9000 | 200 | 750 | 200 | 200 | 18 | 2.25 | 2.50 | 1.92 |
| 4 | KCl + taurine + AMP | 18750 | 9000 | 600 | 750 | 0 | 0 | 18 | 2.22 | 2.47 | 1.61 |
| 5 | KCl + taurine + AMP | 18750 | 9000 | 600 | 400 | 0 | 0 | 18 | 2.64 | 2.64 | 2.00 |
| 6 | KCl + taurine + AMP | 18750 | 9000 | 600 | 1200 | 0 | 0 | 18 | 2.58 | 3.03 | 1.86 |

Results 0.9% KCl+AMP (600 ppm)+taurine (750 ppm)(Sample 4)

As shown in Table 2, the bitterness score for Sample 4 (1.61, KCl+taurine+AMP) was significantly lower than the score for Control 2 (2.83, Reduced Sodium chicken broth with KCl). This indicates that the combination of taurine and AMP added to KCl is highly effective in lowering bitterness. Use of lower and higher amounts of taurine (Samples 5 and 6, 400 ppm and 1200 ppm, respectively) with the same amount of KCl and AMP as in Sample 4 also produced lower bitterness scores compared to Control 2.

0.9% KCl+taurine (750 ppm)+AMP (400 ppm)+GMP (100 ppm)+IMP (100 ppm)(Sample 2)

The bitterness score for Sample 2 (KCl+taurine+AMP+IMP+GMP) was much lower than the bitterness score for Control 2 (1.64 vs. 2.83). This difference in bitterness score was similar to the reduction observed for Sample 4 (1.61 vs. 2.83 for Control 2), suggesting that similar reductions in bitterness can be achieved by substituting a combination of IMP and GMP for a relatively equal amount of AMP.

Although the foregoing invention has been described in some detail by way of illustration and example for purposes of clarity of understanding, this invention is not limited to the particular embodiments disclosed, but is intended to cover all changes and modifications that are within the spirit and scope of the invention as defined by the appended claims.

All publications and patents mentioned in this specification are indicative of the level of skill of those skilled in the art to which this invention pertains. All publications and patents are herein incorporated by reference to the same extent as if each individual publication or patent application were specifically and individually indicated to be incorporated by reference.

It is claimed that:

1. A composition comprising (a) a seasoning mixture comprising a flavoring agent and (b) a salt substitute, wherein said salt substitute comprises potassium chloride, taurine or a physiologically acceptable salt thereof, and a 5'-nucleotide monophosphate, comprising 5'-adenosinic acid (AMP) or 5'-inosinic acid (IMP) or a physiologically acceptable salt thereof.

2. A composition according to claim 1, wherein said 5'-nucleotide monophosphate comprises AMP or a physiologically acceptable salt thereof.

3. A composition according to claim 1, wherein said 5'-nucleotide monophosphate comprises IMP or a physiologically acceptable salt thereof.

4. A composition according to claim 1, wherein said 5'-nucleotide monophosphate comprises a combination of AMP and IMP, or physiologically acceptable salts thereof.

5. A composition according to claim 1, wherein said 5'-nucleotide monophosphate comprises a combination of AMP, IMP and 5'-guanylic acid (GMP) or physiologically acceptable salts thereof.

6. A composition according to claim 5, wherein the amount of said IMP or physiologically acceptable salt thereof is up to about 4% w/w of said salt substitute.

7. A composition according to claim 5, wherein the amount of GMP or physiologically acceptable salt thereof is up to about 4% w/w of said salt substitute.

8. A composition according to claim 5, wherein the amount of said taurine or physiologically acceptable salt thereof is between about 2% and about 15%, the amount of said AMP or physiologically acceptable -guanylic acid (GMP) or physiologically acceptable salts thereof.

9. A composition according to claim 5, wherein the amount of said taurine or physiologically acceptable salt thereof is between about 6% and about 8%, the amount of said AMP or physiologically acceptable salt thereof is between about 3% and about 6%, the amount of said IMP or physiologically acceptable salt thereof is up to about 3% and the amount of said GMP or physiologically acceptable salt thereof is up to about 3%, w/w of said salt substitute.

10. A composition according to claim 5, wherein the amount of said potassium chloride is about 86.95%, the amount of said taurine or physiologically acceptable salt thereof is about 7.25%, the amount of said AMP or physiologically acceptable salt thereof is about 3.86%, the amount of said IMP or physiologically acceptable salt thereof is about 0.97% and the amount of said GMP or physiologically acceptable salt thereof is about 0.97%, w/w of said salt substitute.

11. A method of reducing sodium intake and increasing potassium intake in the diet of an individual, comprising administering to said individual the composition of claim 10.

12. A composition according to claim 1, wherein said 5'-nucleotide monophosphate consists essentially of AMP, IMP, GMP, combinations thereof or physiologically acceptable salts thereof.

13. A composition according to claim 1, wherein said seasoning mixture further comprises a flow agent, binding agent or preservative.

14. A composition according to claim 13, wherein said flavoring agent is between about 60% and about 99%, said flow agent is up to about 2%, said binding agent is up to about 30%, and said salt substitute is between about 1% and about 5%, w/w of said composition.

15. A composition according to claim 14, wherein said flavoring agent is about 86%, said flow agent is about 1%, said binding agent is about 10% and said salt substitute is about 3%, w/w of said composition.

16. A composition according to claim 1, wherein said flavoring agent is selected from a group consisting of a cheese flavoring agent, a meaty flavoring agent, an alliaceous flavoring agent, a tangy flavoring agent, a spicy flavoring agent and combinations thereof.

17. A composition according to claim 1, wherein said flavoring agent is a cheese flavoring agent selected from the group consisting of nacho, cheddar, white cheddar, blue, mozzarella, asiago, american, brick, brie, feta, italian, monterey jack, muenster, provolone, ricotta, romano, swiss, taco and parmesan.

18. A composition according to claim 1, wherein said composition comprises a snack, sauce, corn, pasta or dog biscuit.

19. A composition according to claim 1, wherein said composition comprises a pretzel, popcorn, pizza, cracker, curl, puff, doodle, a chip, wherein said chip is selected from the group consisting of potato, corn, and tortilla.

20. A composition according to claim 1, wherein said salt substitute is between about 1% and about 5% w/w of said composition.

21. A composition according to claim 20, wherein said salt substitute is about 3% w/w of said composition.

22. A composition according to claim 1, wherein said flavoring agent is between about 80% and about 90% w/w of said composition.

23. A composition according to claim 22, wherein said flavoring agent is about 86% w/w of said composition.

24. A composition according to claim 1, wherein the amount of said potassium chloride is between about 80% and about 98% w/w of said salt substitute.

25. A composition according to claim 1, wherein the amount of said taurine or physiologically acceptable salt thereof is between about 2% and about 15% w/w of said salt substitute.

26. A composition according to claim 1, wherein the amount of said AMP or physiologically acceptable salt thereof is between about 1% and about 8% w/w of said salt substitute.

27. A method of reducing sodium intake and increasing potassium intake in the diet of an individual, comprising administering to said individual the composition of claim 1.

28. A method of preparing the composition of claim 1, by mixing said salt substitute with said seasoning mixture.

29. A method of preparing the composition of claim 1, comprising adding to a food the seasoning mixture, or individual ingredients thereof, and the salt substitute, or individual ingredients thereof.

30. A composition comprising (a) a seasoning mixture comprising a cheese flavoring agent, a tangy flavoring agent, an alliaceous flavoring agent, a flow agent and a binding agent and (b) a salt substitute comprising potassium chloride, taurine, and a 5'-nucleotide monophosphate, comprising AMP, IMP, GMP, combinations thereof or physiologically acceptable salts thereof.

31. A composition according to claim 30, wherein said cheese flavoring agent comprises an intense flavoring agent resulting from the enzymatic modification of a cheese.

32. A composition according to claim 31, wherein said intense flavoring agent is derived from romano or blue cheese.

33. A composition according to claim 30, wherein said cheese flavoring agent is between about 60% and about 90% w/w of said composition.

34. A composition according to claim 33, wherein said cheese flavoring agent is between about 75% and about 85% w/w of said composition.

35. A composition according to claim 30, wherein said tangy flavoring agent comprises citric acid.

36. A composition according to claim 30, wherein said tangy flavoring agent is between about 1% and about 10% w/w of said composition.

37. A composition according to claim 36, wherein said tangy flavoring agent is between about 3% and about 7% w/w of said composition.

38. A composition according to claim 30, wherein said alliaceous flavoring agent comprises onion powder or garlic powder.

39. A composition according to claim 38, wherein said onion powder is up to about 5% w/w of said composition.

40. A composition according to claim 38, wherein said garlic powder is up to about 5% w/w of said composition.

41. A composition according to claim 38, wherein the amount of said cheese flavoring agent is about 79.5%, the amount of said tangy flavoring agent is about 3.5%, the amount of said onion powder is about 2%, the amount of said garlic powder is about 1%, the amount of said flow agent is about 1%, and the amount of said binding agent is about 10%, and the amount of salt substitute is about 3%, w/w of said composition, wherein said potassium chloride is about 86.95%, said taurine or physiologically acceptable salt thereof is about 7.25%, said AMP or physiologically acceptable salt thereof is about 3.86%, said IMP or physiologically acceptable salt thereof is about 0.97% and said GMP or physiologically acceptable salt thereof is about 0.97%, w/w of said salt substitute.

42. A method of reducing sodium intake and increasing potassium intake in the diet of an individual, comprising administering to said individual the composition of claim 41.

43. A method of preparing the composition of claim 41, by mixing said salt substitute with said seasoning mixture.

44. A composition according to claim 30, wherein said cheese flavoring agent is between about 60% and about 90%, said tangy flavoring agent is between about 1% and about 10% and said alliaceous flavoring agent is up to about 10%, w/w of said composition.

45. A composition according to claim 30, wherein said cheese flavoring agent is between about 75% and about 85%, said tangy flavoring agent is between about 3% and about 7% and said alliaceous flavoring agent is up to about 10%, w/w of said composition.

46. A composition according to claim 45, wherein said flow agent is about 1% and said binding agent is about 10%, w/w of said composition.

47. A composition according to claim 30, wherein said cheese flavoring agent is about 79.5%, said tangy flavoring agent is about 3.5% and said alliaceous flavoring agent is about 3%, w/w of said composition.

48. A composition according to claim 30, wherein said flow agent is up to about 2% w/w of said composition.

49. A composition according to claim 30, wherein said binding agent is up to about 30% w/w of said composition.

50. A composition according to claim 30, further comprising a bulking agent.

51. A composition according to claim 30, further comprising a preservative.

52. A composition according to claim 30, wherein said salt substitute is between about 1% and about 5% w/w of said composition.

53. A composition according to claim 30, wherein said salt substitute is about 3% w/w of said composition.

54. A composition according to claim 30, wherein the amount of said potassium chloride is between about 80% and about 98% w/w of said salt substitute.

55. A composition according to claim 30, wherein the amount of said taurine or physiologically acceptable salt thereof is between about 2% and about 15% w/w of said salt substitute.

56. A composition according to claim 30, wherein the amount of said AMP or physiologically acceptable salt thereof is between about 1% and about 8% w/w of said salt substitute.

57. A composition according to claim 30, wherein the amount of said IMP or physiologically acceptable salt thereof is up to about 4% w/w of said salt substitute.

58. A composition according to claim 30, wherein the amount of GMP or physiologically acceptable salt thereof is up to about 4% w/w of said salt substitute.

59. A composition according to claim 30, wherein the amount of said taurine or physiologically acceptable salt thereof is between about 2% and about 15%, the amount of said AMP or physiologically acceptable salt thereof is between about 1% and about 8%, the amount of said IMP or physiologically acceptable salt thereof is up to about 4% and the amount of said GMP or physiologically acceptable salt thereof is up to about 4%, w/w of said salt substitute.

60. A composition according to claim 30, wherein the amount of said taurine or physiologically acceptable salt thereof is between about 6% and about 8%, the amount of said AMP or physiologically acceptable salt thereof is between about 3% and about 6%, the amount of said IMP or physiologically acceptable salt thereof is up to about 3% and the amount of said GMP or physiologically acceptable salt thereof is up to about 3%, w/w of said salt substitute.

61. A composition according to claim 30, wherein the amount of said potassium chloride is about 86.95%, the amount of said taurine or physiologically acceptable salt thereof is about 7.25%, the amount of said AMP or physiologically acceptable salt thereof is about 3.86%, the amount of said IMP of physiologically acceptable salt thereof is about 0.97% and the amount of said GMP of physiologically acceptable salt thereof is about 0.97%, w/w of said salt substitute.

62. A method of reducing sodium intake and increasing potassium intake in the diet of an individual, comprising administering to said individual the composition of claim 30.

63. A method of preparing the composition of claim 30, by mixing said salt substitute with said seasoning mixture.

64. A method of preparing the composition of claim 30, comprising adding to a food the seasoning mixture, or individual ingredients thereof, and the salt substitute, or individual ingredients thereof.

* * * * *

UNITED STATES PATENT AND TRADEMARK OFFICE
CERTIFICATE OF CORRECTION

| | |
|---|---|
| PATENT NO. | : 7,452,563 B2 |
| APPLICATION NO. | : 11/155738 |
| DATED | : November 18, 2008 |
| INVENTOR(S) | : Salemme et al. |

It is certified that error appears in the above-identified patent and that said Letters Patent is hereby corrected as shown below:

In column 15, lines 34-38, please amend claim 8 to read "A composition according to claim 5, wherein the amount of said taurine or physiologically acceptable salt thereof is between about 2% and about 15%, the amount of said AMP or physiologically acceptable salt thereof is between about 1% and about 8%, the amount of said IMP or physiologically acceptable salt thereof is up to about 4% and the amount of said GMP or physiologically acceptable salt thereof is up to about 4% w/w of said salt substitute."

Signed and Sealed this

Third Day of March, 2009

JOHN DOLL
*Acting Director of the United States Patent and Trademark Office*